United States Patent
Noro

[19]

[11] Patent Number: 6,035,314
[45] Date of Patent: Mar. 7, 2000

[54] INFORMATION PROCESSING METHOD

[75] Inventor: Masayuki Noro, Kanagawa, Japan

[73] Assignee: Fujitsu Limited, Kawasaki, Japan

[21] Appl. No.: 08/772,369

[22] Filed: Dec. 23, 1996

[30] Foreign Application Priority Data

Jul. 17, 1996 [JP] Japan ................................ 8-187941

[51] Int. Cl.7 .................................................. G06F 7/38
[52] U.S. Cl. ............................. 708/446; 708/3; 708/9; 708/802; 712/220
[58] Field of Search .................................. 364/602, 608, 364/718.01, 761, 735, 808; 395/500; 11/561; 708/270, 446, 3, 9, 650, 802; 712/220

[56] References Cited

U.S. PATENT DOCUMENTS 5,142,579  8/1992  Anderson ................................ 380/30
5,263,085  11/1993  Shamir ................................... 380/30
5,678,055  10/1997  Noro ..................................... 364/735

*Primary Examiner*—Emmanuel L. Moise
*Attorney, Agent, or Firm*—Staas & Halsey LLP

[57] ABSTRACT

The reliability of solutions of simultaneous algebraic equations with integral coefficients is improved and high-speed information processing is realized. A method processes information wherein, in a model in which restrictions among parameters are given by simultaneous algebraic equations with integral coefficients, when the simultaneous equations have only a finite number of solutions, zero points of a polynomial set F with integral coefficients, which represents the simultaneous equations and is described in a memory, are represented by rational expressions based on zero points of a one-variable polynomial regarding one variable so that the information is represented using the representation of rational expression. The method processes information by choosing a term order, calculates a Gröbner basis, calculates a minimum polynomial f1, and controls a digital processor to find solutions represented by rational expressions.

14 Claims, 7 Drawing Sheets

FIG. 2

THE MINIMAL POLYNOMIAL $(O_1, G_1, \{x_1, \cdots, x_n\})$ (Term order $O_1$, Gröbner basis $G_1$ relating to $O_1$, Variables $x_1, \cdots, x_n$)

(1) p ← Prime number which does not divide any head coefficient of all elements of $G_1$ and is not used — 31

$f_1(x_1)$ ← The minimal polynomial of $x_1$ regarding p as the modulus — 32

E ← Linear equation in which the coefficients of $f_1(x_1)$ are replaced by undetermined coefficients to calculate a normal form given by $G_1$ and the coefficients are eliminated and replaced by 0 — 33

Does E have any solution? — 34

No → Return to (1) — 35

Yes ↓

Return the minimal polynomial formed based on the solution of E — 36

F I G. 7
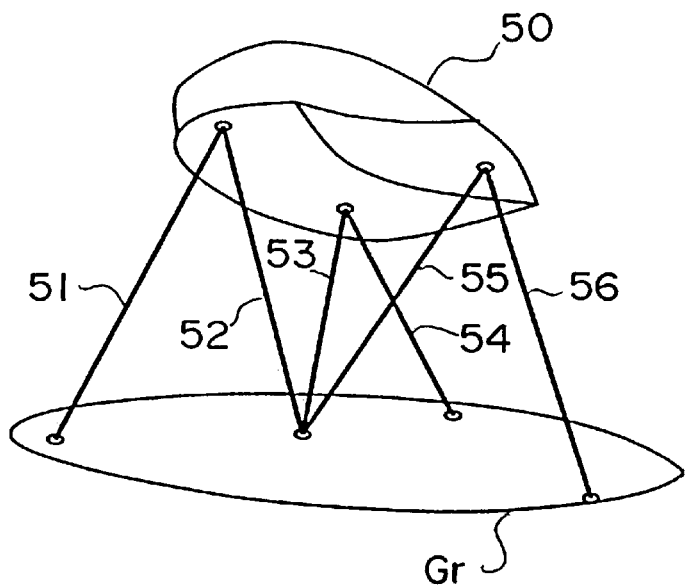
F I G. 8
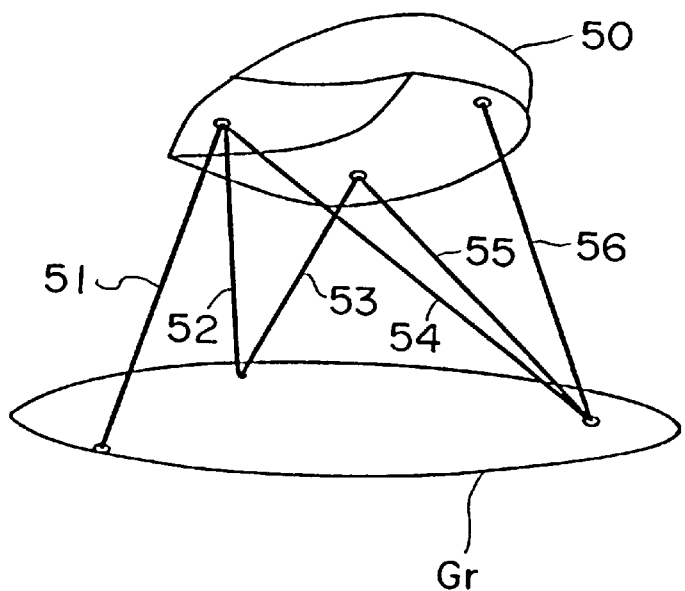

INFORMATION PROCESSING METHOD

BACKGROUND OF THE INVENTION

1. Field of the Invention

The present invention relates to a method for processing information by using the method for representing rational expression which is effective for solving simultaneous algebraic equations and so on.

2. Description of the Related Art

Recently, the use of a expression processing system has been practical in order to solve scientific and engineering problems. The high-accuracy in solving simultaneous equations including linear equations is fundamental in the expression processing system which processes expression. Increasing the accuracy is an important factor which improves the performance of the whole system.

In the expression processing system, the Gröbner basis has been used as a general solver for solving simultaneous algebraic equations. However, sometimes it happens that the resultant coefficient becomes quite large amount.

This phenomenon is most pronounced in an equation in which the number of solutions is finite. As a result of this, the calculational volume of Gröbner basis becomes so large temporally and spatially.

Since the calculational volume becomes so large temporally and spatially, the processing time for information processing using the Gröbner basis becomes longer and the rate of occupying memory is increased, with the result that the information processing at high efficiency is impossible.

Therefore, the following representation of solutions by rational expressions is considered to be effective in compensating for the drawback.

In case of the Gröbner basis, the solutions of the equation are represented by:

$$f_1(x_1)=0, x_2=f_2(x_1), \ldots, x_n=f_n(x_1)$$

(all of "f" are polynomial.).

In case of the representation of rational expression, the solutions are represented by:

$$f_1(x_1)=0, x_2=g_2(x_1)/f'_1(x_1), \ldots, x_n=g_n(x_1)/f'_1(x_1)$$

(all of "$f'_1(x_1)$" are differential of polynomial "$f_1(x_1)$".).

In finding the solutions of the given equation, once $f_1(x_1)=0$ is solved, other variables may be obtained by the substitution. Therefore, the above expressions are considered as the same each other.

The advantage of the representation of rational expression is that the coefficient of $g_i$ is almost remarkably smaller than the coefficient of $f_i$. As a result of this, there is a possibility of reducing the time and the memory required for finding $g_i$ as compared with $f_i$.

When using the obtained solutions in the information processing, the common difference increases as coefficient becomes greater. To avoid increase in common difference, it is necessary to solve the $f_1(x_1)$ at quite high accuracy. Using the representation of rational expression makes the coefficients smaller i.e. the result will be small value, thereby also making the common difference smaller. At the same time, the calculational load is reduced, thereby speeding up the information processing.

A method using the character of the symmetric expressions is proposed as one of methods for finding solutions of this type. In this method, when the number of the solutions is N, a table is made by calculating normal forms of $N^2$ monomials $\{\Omega_k \Omega_l\}$ relative to the tabulation of N monomials $\{\Omega_k\}$. On the basis of the table, the trace of powers of matrix is calculated. Finally, $f_i$ and $g_i$ are calculated by forming characteristic polynomials of the matrix.

Though the representation of solutions by rational expressions is possible according to the method as mentioned above, there are, in practice, problems as follows.

1) When the number N of the solutions is large, the time and memory required for calculating $N^2$ normal forms are increased.
2) While the number of the normal forms to be really calculated can be reduced by various ideas, the time and memory required for calculating the aforementioned table are rapidly increased when N is large.
3) Because the order of calculations is important to increase the calculating efficiency, it is difficult that the calculations are made in parallel.
4) Furthermore, it is not assured that the resultant solutions represent all of the solutions.

SUMMARY OF THE INVENTION

The present invention employs the following method in order to overcome the problems 1) through 4) as mentioned above.

The present invention is based on the perception that, in calculation of the polynomial having the minimum degree of one variable $x_1$, i.e. the minimum polynomial $f_1(x_1)$, based on Gröbner basis $G_1$, the degree of $f_1(x_1)$ equal to the number of the solutions given by $G_1$ means that all of the solutions can be represented of rational expressions. That is:

1. first of all, the minimum polynomial of $x_1$ is found to decide whether all of the solutions can be represented by rational expressions or not,
2. a table to be required is a normal table of monomials of which the number is N at the most, and
3. the solutions can be calculated in such a time as corresponding the to volume of the representation of the solutions by using linear equations.

This means that the present invention is defined as follows. The present invention provides a method of processing information wherein, in a model in which restrictions among-parameters are given by simultaneous algebraic equations with integral coefficients, when the simultaneous equations have only a finite number of solutions, zero points of a polynomial set F with integral coefficients, which represents the simultaneous equations and is described in a memory, are represented by rational expressions based on zero points of a one-variable polynomial regarding one variable so that the information is processed using the representation of rational expression. Therefore, the method of processing information of the present invention comprises steps of:

1-1. choosing a term order $O_1$ for facilitating the calculation of the Gröbner basis;
1-2. calculating the Gröbner basis $G_1$ of F with regard to $O_1$;
1-3. calculating the minimum polynomial $f_1(x_1)$ based on $G_1$, the minimum polynomial $f_1(x_1)$ being a polynomial having the minimum degree of the variable $x_1$; and
1-4. when it is decided that the degree of $f_1(x_1)$ is equal to the number of solutions given from $G_1$,
1-5. controlling the digital processor to find solutions represented by rational expressions that is, $\{f_1(x_1)=0, x_2=f_2(x_1)/f'_1(x_1), \ldots, x_n=f_n(x_1)/f'_1(x_1)\}$ [notes: $f'_1(x_1)$ is differential of $f_1(x_1)$.].

In the present invention, it is decided whether the representation of rational expression is possible or not in the step 1-4, by finding the minimum polynomial in the step 1-3.

The minimum polynomial can be obtained in the aforementioned step 2-1~2-3 by the following steps of:

2-1. selecting a prime number p which does not divide any head coefficient of all elements of ($G_1$) and assuming φp as an operation of replacing the coefficient by the remainder regarding the prime number p;

2-2. obtaining the minimum polynomial $f_1(x_1)$ of $x_1$ obtained by φp ($G_1$), regarding p as the modulus;

2-3. obtaining a one-variable polynomial $f_1(x_1)$ in which the degree is equal to $f_1$ by replacing the coefficients of $f_1(x_1)$ by undetermined coefficients to calculate normal forms given by $G_1$ and eliminating the coefficients to solve linear equations with regard to the undetermined coefficients;

2-4. when the one-variable polynomial $f_1(x_1)$ is not obtained, repeating the steps 2-2 and 2-3 with replacing p to obtain the minimum polynomial of $x_1$.

The representation of solutions by rational expressions can be obtained in the aforementioned step 3-1~3-5 by the following steps of:

3-1. selecting a prime number p which does not divide any head coefficient of all elements of ($G_1$) and assuming (p as an operation of replacing the coefficient by the remainder regarding the prime number p;

3-2. calculating Gröbner basis $G_2$ with regard to the lexicographical order of φp ($G_1$);

3-3. obtaining a one-variable polynomial $f_1(x_1)$ by calculating normal forms given by $G_1$ of difference between $f'_1(x_1) x_i$ and the normal form of $f'_1(x_1) x_i$ given by $G_2$ in which the coefficients are replaced by undetermined coefficients in given by $G_1$ for every i (i=2, ..., n) and eliminating the coefficients to solve linear equations with the undermined coefficients;

3-4. returning a rational expression: $\{f_1(x_1)=0, x_2=f_2(x_1)/f'_1(x_1), \ldots, x_n=f_n(x_1)/f'_1(x_1)\}$ as the solutions; and 3-5. repeating steps 3-2 through 3-4 re-selecting p selected in the step 3-1 when any one of the linear equations can not be solved.

The method of the present invention can be processed by a parallel computer. In this case, the each of $f_i$ are simultaneously obtained by different processors.

<When Representation of Rational Expressions is Impossible>

As mentioned above, the present invention is characterized in that it is decided whether the representation of rational expression is possible or not in the step 1-4, by finding the minimum polynomial in the step 1-3. On the other hand, there is a problem of processing in case where the degree of $f_1(x_1)$ is not equal to the number of the solutions given by $G_1$ as a result of finding the minimum polynomial in the step 1-3.

In this case, the method further comprises steps of:

5-1. selecting a prime number p which does not divide any head coefficient of all elements of ($G_1$) and assuming φp as an operation of replacing the coefficient by the remainder regarding the prime number p;

5-2. calculating Gröbner basis $G_2$ with regard to the term order O of φp ($G_1$);

5-3. finding an integral coefficient polynomial $f_h$ for each element h of $G_2$ of which the head coefficient is not divisible by p and the number of head terms coincide with the domain of h;

5-4. when the integral coefficient polynomials $f_h$ are found for all of the elements h of $G_2$, outputting the whole of $f_h$ as Gröbner basis of the integral polynomial set F with regard to the term order O; and 5-5. when any one of the integral coefficient polynomials $f_h$ is not found, re-selecting p selected in said step 5-1 and controlling the digital processor to repeat the steps 5-2 through 5-4 to generate the Gröbner basis.

By using the method as mentioned above, the preparation of a plurality of medium-grade term orders relative to a term order O (assuming $O_1, O_2, \ldots, O_n=O$) and the exchange of bases $O_1 \rightarrow O_2, O_2 \rightarrow O_3, \ldots, O_{n-1} \rightarrow O_n$ are executed. $f_h$ in the step 5-3 can be found in a candidate generating method by trace-lifting comprising steps of:

7-1. first of all, calculating Gröbner basis in the modulus p;

7-2. storing a history about members and terms in which the elimination was executed and pairs normalized to O, during normalizing φ(P) in this process;

7-3. calculating the Gröbner basis on rational number based on the history of the foregoing paragraph, at this stage, not executing the normalization on the rational number in relation to the pairs normalized to O in the modulus p, but executing the normalization on the rational number based on the history in relation to pairs normalized to polynomial which is not O in the modulus p, 7-4. returning "nil" assuming that the method of selecting p is not appropriate, when the normalization on the rational number does not correspond to the normalization in the modulus p. $f_h$ in the step 5-3 can be found by replacing coefficients of elements of $G_2$ by undetermined coefficients to calculate normal forms given by $G_1$ and eliminating the coefficients to solve linear equations with regard to the undetermined coefficients.

According to the present invention, the use of the representation of rational expression makes the coefficients smaller, thereby speeding up the calculation and thus reducing the required memory. Since it is previously decided whether the representation of rational expression is possible or not, the reliability of solutions becomes higher and, even when the representation of rational expression is impossible, the most suitable solutions can be obtained, thereby smoothing and speeding up the whole process.

<Program>

The present invention is executed by a program. This program is stored in a storage medium and then installed in an information processing unit so that the program is executed.

BRIEF DESCRIPTION OF THE DRAWING

FIG. 2 is a flow chart for representation of rational expression according to the present invention, FIG. 7 is a view (1) showing positions of arms of a robot, and FIG. 8 is a view (2) showing positions of the arms of the robot.

DETAILED DESCRIPTION OF THE PREFERRED EMBODIMENT

Hereinafter, preferred embodiments of the present invention will be described with reference to attached drawings.

As a program concerned in the present invention runs, a central processing unit (a digital processor) processes according to a concept of a device comprising the following means.

Figure 1:
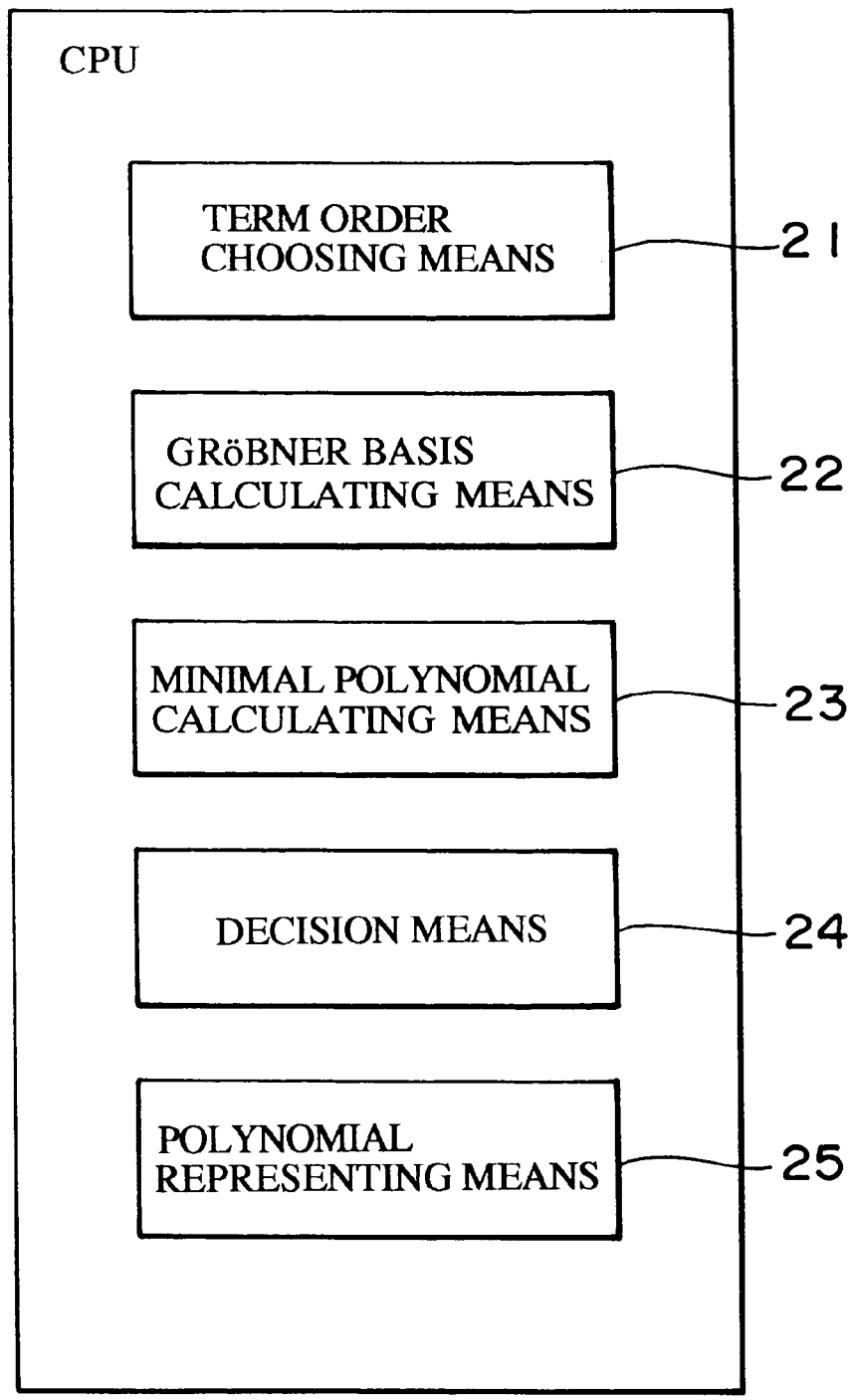
FIG. 1 is a block diagram expressing the concept of the present invention.

That is, as shown in FIG. 1, in a model in which restrictions among parameters are given by simultaneous algebraic equations with integral coefficients, when the simultaneous equations have only a finite number of solutions, the device represents zero points of a polynomial set F with integral coefficients, which represents the simultaneous equations and is described in a memory, by rational expressions based on zero points of a one-variable polynomial regarding one variable so that the device processes information using the representation of rational expression, wherein the device is an information processor comprising:

1. term order choosing means 21 for choosing an order $O_1$ among terms for facilitating the calculation of the Gröbner basis, 2. Gröbner basis calculating means 22 for calculating the Gröbner basis $G_1$ of F with regard to $O_1$, 3. minimum polynomial calculating means 23 for calculating the minimum polynomial $f_1$ based on $G_1$, the minimum polynomial $f_1$ being a polynomial having the minimum degree of the variable $X_1$, 4. decision means 24 for deciding whether the degree of $f_1(x_1)$ is equal to the number of solutions given from $G_1$ or not, and 5. polynomial representing means 25 for controlling the digital processor to obtain solutions represented by rational expressions $\{f_i(x_1)=0, x_2=f_2(x_1)/f'_1(x_1), \ldots, x_n=f_n(x_1)/f'_1(x_1)\}$ [notes: $f'_1(x_1)$ is differential of $f_1(x_1)$.] when it is decided that the degree of $f_1(x_1)$ is equal to the number of the solutions given from $G_1$.

The information processor executes the following algorithm for the calculating of the minimum polynomial and the representation of the solutions by rational expressions.

Figure 4:
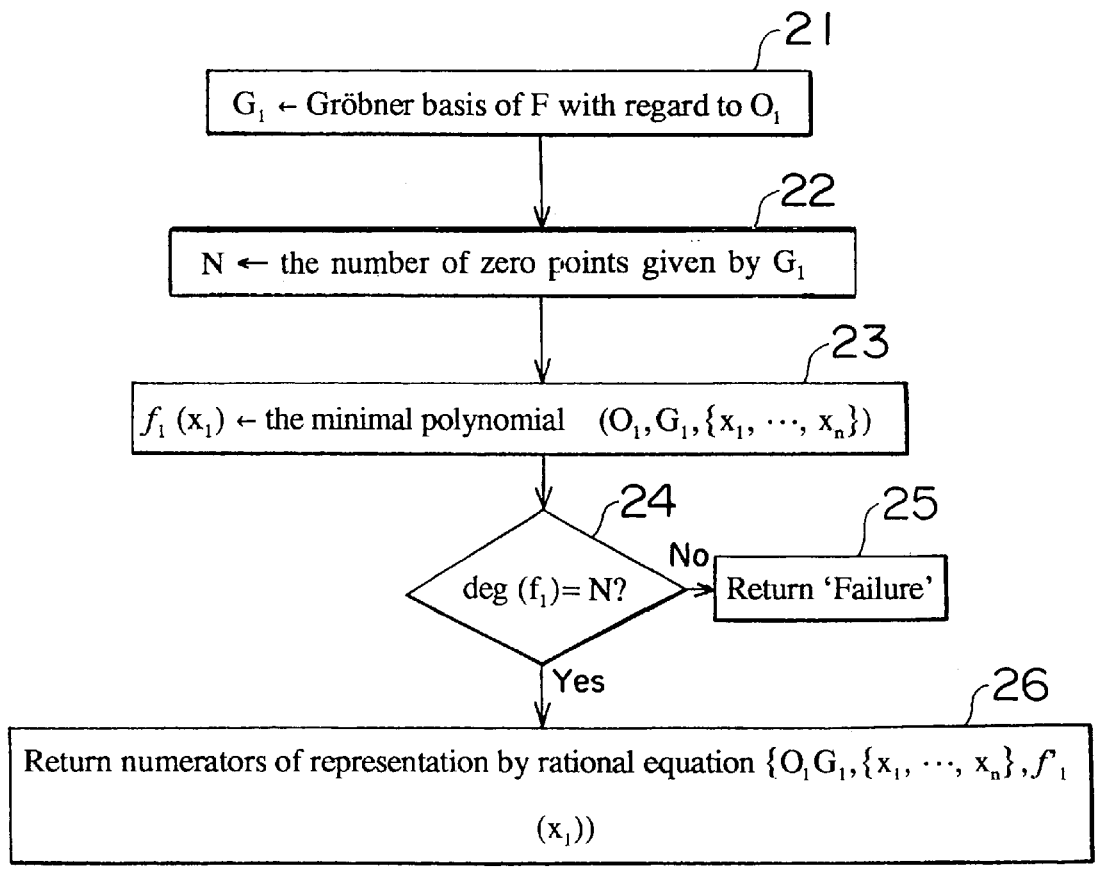
FIG. 4 is a flow chart showing calculation for obtaining numerators of the representation of rational expression.

Algorithm—representation of rational expression (FIG. 4)

Input: polynomial set F in which the number of zero points is finite, term order $O_1$, and variables $x_1, \ldots, x_n$ Output: representation of zero points of F by rational expressions in case where the representation of solutions by rational expressions is possible Step 21: G←Gröbner basis of F with regard to $O_1$, Step 22: N←the number of zero points given by $G_1$, Step 23: $f_1$←the minimum polynomial of $x_1$ given by $G_1$, Step 24: decide whether deg ($f_1$) is equal to N or not, Step 25: when deg ($f_1$) is not equal to N, shift to the calculation of Gröbner basis (described later), and Step 26: when deg ($f_1$) is equal to N, calculate the representation of rational expression and return the result.

Algorithm—calculation of the minimum polynomial (FIG. 2)

Input: term order $O_1$, and variables $x_1, \ldots, x_n$ of Gröbner basis with regard to $O_1$ Output: the minimum polynomial of $x_1$ Step 31: (1) p←a prime number which does not divide any head coefficient of all elements of $G_1$ and is not used, Step 32: $f_1(x_1)$←the minimum polynomial of $x_1$ regarding p as the modulus, Step 33: E←a linear equation in which the coefficients of $f_1(x_1)$ are replaced by undetermined coefficients to calculate a normal form given by $G_1$ and the coefficients are eliminated and replaced by O, Step 34: decide whether E has any solution or not, Step 35: when E has no solution, return to (1), and Step 36: when E has any solution, form the minimum polynomial based on the solution of E and then return it.

Figure 3:
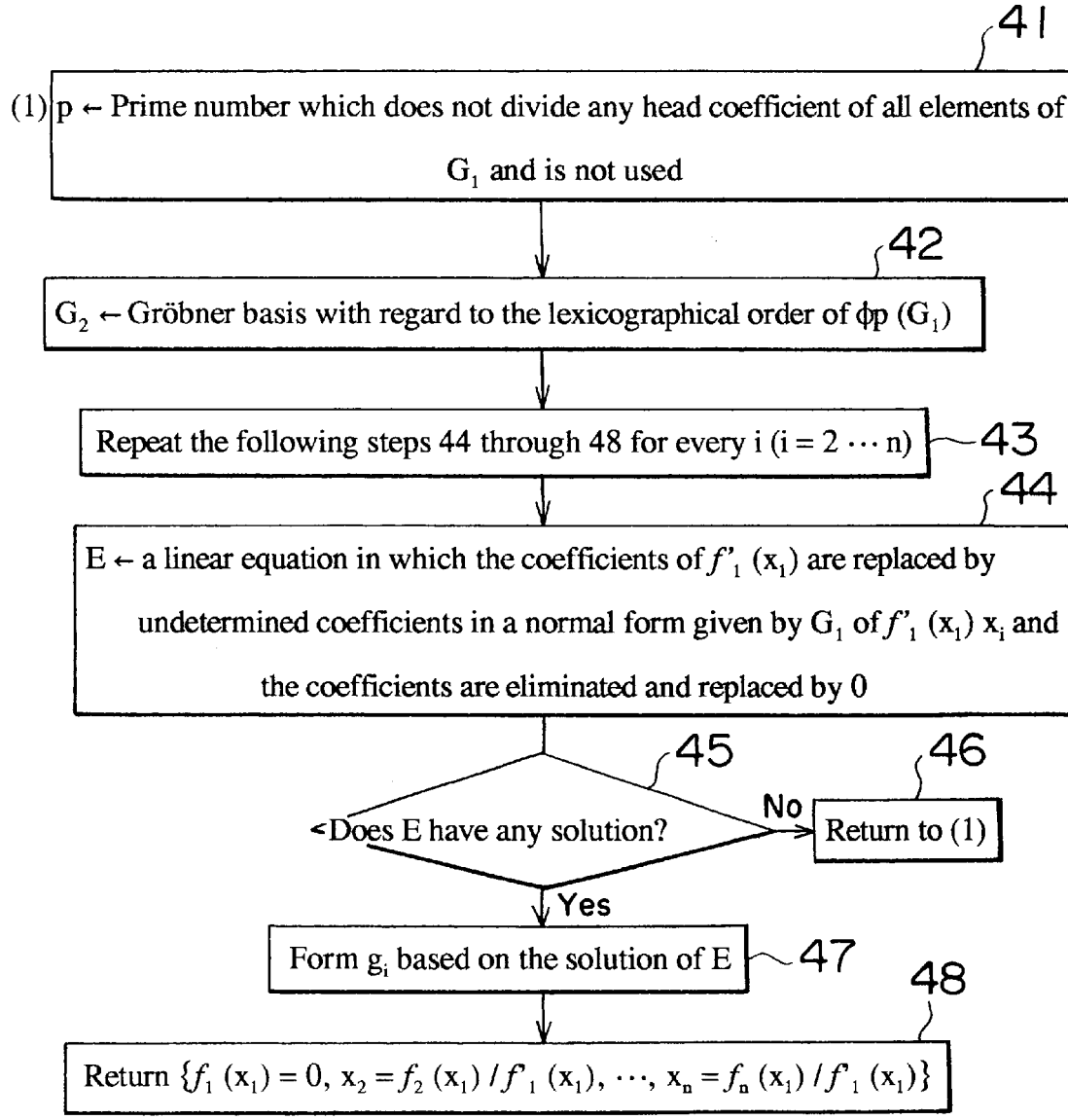
FIG. 3 is a flow chart showing calculation for obtaining the minimum polynomial.

Algorithm—calculation of numerators of the representation of rational expression (FIG. 3)

Input: term order $O_1$, variables $x_1, \ldots, x_n$ of Gröbner basis with regard to $O_1$, the minimum polynomial $f_1(x_1)$ of $x_1$ Output: representation of rational expression Step 41: (1) p←a prime number which does not divide any coefficient of the head terms of all elements of $G_1$ and is not used, Step 42: $G_2$←Gröbner basis with regard to the lexicographical order of φp ($G_1$), Step 43: repeat the following steps 44 through 48 for every i (i=2, ..., n), Step 44: E←a linear equation in which the coefficients of $f'_1(x_1)$ are replaced by undetermined coefficients in a normal form given by GI of $f'_1(x_1) x_i$ and the coefficients are eliminated and replaced by O, Step 45: decide whether E has any solution or not, Step 46: when E has no solution, return to (1), Step 47: when E has any solution, form gi based on the solution of E, Step 48: return the representation of rational expression: $\{f_1(x_1)0, x_2=f_2(x_1)/f'_1(x_1), \ldots, x_n=f_n(X_3)/f'_1(x_1)\}$.

In the present invention, first of all, the minimum polynomial of one variable is calculated. The degree of the polynomial is compared with the number of the solutions given by the inputted Gröbner basis so as to determine whether the solutions can be represented by rational expressions with regard to the variable or not. When it is decided that the representation of rational expression is possible, the Gröbner basis calculation on the rational number is executed and the representation of rational expression on the rational number is then given by the undetermined coefficient method and the linear equation.

To execute the undetermined coefficient method, it is necessary to obtain normal forms of some monomials. However, the number of the normal forms is equal to the number of the solutions at the most.

In the present invention, calculating linear equations is the most time-consuming stage, but the linear equations can be efficiently solved by first working out equations on the rational number and improving the accuracy by Hensel system.

Furthermore, the linear equations are solved by different digital processors, respectively, so that it only takes the real time required for solving a linear equation.

The followings are samples of simultaneous algebraic equations in which the number of solutions is finite.

$K_5 = [u_0 + 2u_1 + 2u_2 + 2u_3 + 2u_4 + 2u_5 - 1,$
$2u_4 u_0 + (2u_3 + 2u_5) u_1 + u_2^2 - u_4,$ $2u_3u_0+(2u_2+2u_4)\ u_1+2u_5u_2-u_3$, $2u_2u_0+u_1^2+2u_3u_1+(2u_4-1)\ u_2+2u_5u_3$, $2u_1u_0+(2u_2-1)\ u_1+2u_3u_2+2u_4u_3+2u_5u_4$, $u_0^2-u_0+2u_1^2+2u_2^2+2u_3^2+2u_4^2+2u_5^2]$ $K_6=[u_0+2u_1+2u_2+2u_3+2u_4+2u_5+2u_6-1,$ $2u_5u_0+(2u_4+2u_6)\ u_1+2u_3u_2-u_5$, $2u_4u_0+(2u_3+2u_5)\ u_1+u_2^2+2u_6u_2-u_4$, $2u_3u_0+(2u_2+2u_4)\ u_1+2u_5u_2+(2u_6-1)\ u_3$, $2u_2u_0+u_1^2+2u_3u_1+(2u_4-1)\ u_2+2u_5u_3+2u_6u_4$, $2u_1u_0+(2u_2-1)\ u_1+2u_3u_2+2u_4u_3+2u_5u_4+2u_6u_5$, $u_0^2-u_0+2u_1^2+2u_2^2+2u_3^2+2u_4^2+2u_5^2+2u_6^2]$ $K_7=[u_0+2u_1+2u_2+2u_3+2u_4+2u_5+2u_6+2u_7-1,$ $2u_6u_0+(2u_5+2u_7)\ u_1+2u_4u_2+u_3^2-u_6$, $2u_5u_0+(2u_4+2u_6)\ u_1+(2u_3+2u_7)u_2-u_5$, $2u_4u_0+(2u_3+2u_5)\ u_1+u_2^2+2u_6u_2+2u_7u_3-u_4$, $2u_3u_0+(2u_2+2u_4)\ u_1+2u_5u_2+(2u_6-1)\ u_3+2u_7u_4$, $2u_2u_0+u_1^2+2u_3u_1+(2u_4-1)\ u_2+2u_5u_3+2u_6u_4+2u_7u_5$, $2u_1u_0+(2u_2-1)\ u_1+2u_3u_2+2u_4u_3+2u_5u_4+2u_6u_5+2u_7u_6$, $u_0^2-u_0+2u_1^2+2u_2^2+2u_3^2+2u_4^2+2u_5^2+2u_6^2+2u_7^2]$

In the above equations, as for $K_n$ (n=5, 6, 7), the representation of solutions by rational expressions is possible with regard to $x_n$.

$C_6=[abcde-1,$ abcde+Bcdef+cdefa+defab+efabc+fabcd, abcd+bcde+cdef+defa+efab+fabc, abc+bcd+cde+def+efa+fab, ab+bc+cd+de+ef+fa, a+b+c+d+e+f]

Mod=[a+b+c+d+e, (b+e) a+cb+dc+ed, ((c+e) b+ed) a+dcb+edc, ((ec+ed) b+edc) a+(e+1) dcb, edcba−1]

As for $K_n$, the minimum polynomial and the representation of rational expression with regard to $X_n$ are found.

As for $C_6$, the minimum polynomial and the representation of rational expression with regard to $C_0-C_1+2C_2-3C_3-4C_4+3C_5$ are found.

As for Mod, the minimum polynomial and the representation of rational expression with regard to a−b+2c+d−e are found.

As for $C_6$ and Mod, the representation of rational expression is impossible with regard to any variables. Therefore, a search is conducted on the rational number on the system to obtain variables which allow the representation of solutions by rational expressions.

Table 1 shows the results in comparison of calculating speeds for the each problem by the conventional methods and the methods of the present invention. The calculating speeds are indicated in seconds required for calculating the representation of solutions by rational expressions after inputting the Gröbner basis in the all degree inverse lexicographical order. The computer used for the calculations is FUJITSU S-4/61 (CPU: SuperSparc/60 MHz; Main storage 160 MB).

TABLE 1

| | $C_6$ | Mod | $K_5$ | $K_6$ | $K_7$ |
|---|---|---|---|---|---|
| GSL$_{-Hensel}$ | 32 | 41 | 11 | 141 | 1954 |
| GSL-PoSSo | 349 | 43 | 9 | 106 | 2140 |
| GSL$_{-Hensel-Para}$ | 17 | 21 | 6 | 57 | 773 |
| Dimenssion | 156 | 64 | 32 | 64 | 128 |

In Table 1, the computing speeds (sec.) are measured when the problems are calculated by using PoSSo Library and the expression processing system Risa/Asir being developed by the inventor, running on FUJITSU S—4/61 (Super CPU, 60 MHz).

While the conventional method using a table of normal forms and symmetric expressions is executed in the PoSSo Library, the method of the present invention is executed in the Risa/Asir.

As for $K_5$ and $K_6$, at first glance the PoSSo Library is better than the Risa/Asir. However, the greater the number of solutions, the smaller the difference therebetween and, as for $K_7$, the Risa/Asir is better than the PoSSo Library. This is because with increasing the number of solutions, the time and memory required for calculating normal forms are rapidly increased in the conventional method.

As for $C_6$ and Mod, the Risa/Asir is better than the PoSSo Library wherein the difference is pronounced particularly in $C_6$. This is because the number of solutions is greater and the number of resultant coefficients is smaller in $C_6$. The method according to the present invention exhibits the pronounced effect on such a problem. Table 1 also shows the real times required for solving the linear equations in case of using the digital processor. Since the method of the present invention allows the most time-consuming parts to be processed in parallel, the great effect is apparently shown as compared with the conventional method.

<When Representation of Rational Expressions is Impossible>

When deg (f1)=N does not hold, it is decided that the calculation was failed. In this case, the process proceeds the following steps. The processing steps have been disclosed in Japanese Patent Application No. H07-29154.

The processing steps are based on the following theorem. Hereinafter, the ideal elements generated by the polynomial set F will be referred as Id (F).

Theorem

When assuming F is an integral coefficient polynomial set, $O_1$ and $O_2$ are term orders, $G_1$ is Gröbner basis of F with regard to $O_1$, and p is a prime number, Condition 1: if the head term of g with regard to $O_1$ is divisible by p for each element g of $G_1$ and $\phi p$ (g) belongs to Id (F) (it should be noted that (p means the operation of selecting a prime number p which is impossible to divide any head coefficient of all elements of $G_1$ and replacing the coefficient by the remainder regarding the prime number p.), i) $\phi p$ (G,) is Gröbner basis of $\phi p$ (F) with regard to $O_2$, and;

Condition 2: if there is an integral coefficient polynomial $f_h$ belonging to Id (F) for each element h of $G'_2$ and the head term of $f_h$ with regard to $O_2$ is not divisible by p wherein the head terms of $f_h$ and h with regard to $O_2$ coincide with each other when $G'_2$ is the Gröbner basis of $\phi p$ (F) with regard to $O_2$, ii) $G_2\{f_n|h\ ((G)'_2\}$ is Gröbner basis of F with regard to $O_2$'.

In this theorem, the condition 2 is satisfied when the generation of the Gröbner basis candidate by trace-lifting is successful. In the trace-lifting, after that, it is necessary to check whether $G_2$ is actually the Gröbner basis or not. This is the most serious trouble in the above paragraph. However, according to this theorem, it can be found that $G_2$ is the Gröbner basis without checking when the Gröbner basis is already calculated in the other term order and the prime number p is selected in such a manner as to satisfy the condition 1.

Therefore, when the time required for calculating the Gröbner basis in the other term order is smaller than the time required for the checking, the most serious trouble in the above paragraph can be avoided.

In this theorem, the condition 2 is satisfied when the generation of the Gröbner basis candidate by trace-lifting is successful. In the trace-lifting, after that, it is necessary to check whether $G_2$ is actually the Gröbner basis or not. This is the most serious trouble in the above paragraph. However, according to this theorem, it can be found that $G_2$ is the Gröbner basis without checking when the Gröbner basis is already calculated in the other term order and the prime number p is selected in such a manner as to satisfy the condition 1.

Figure 5:
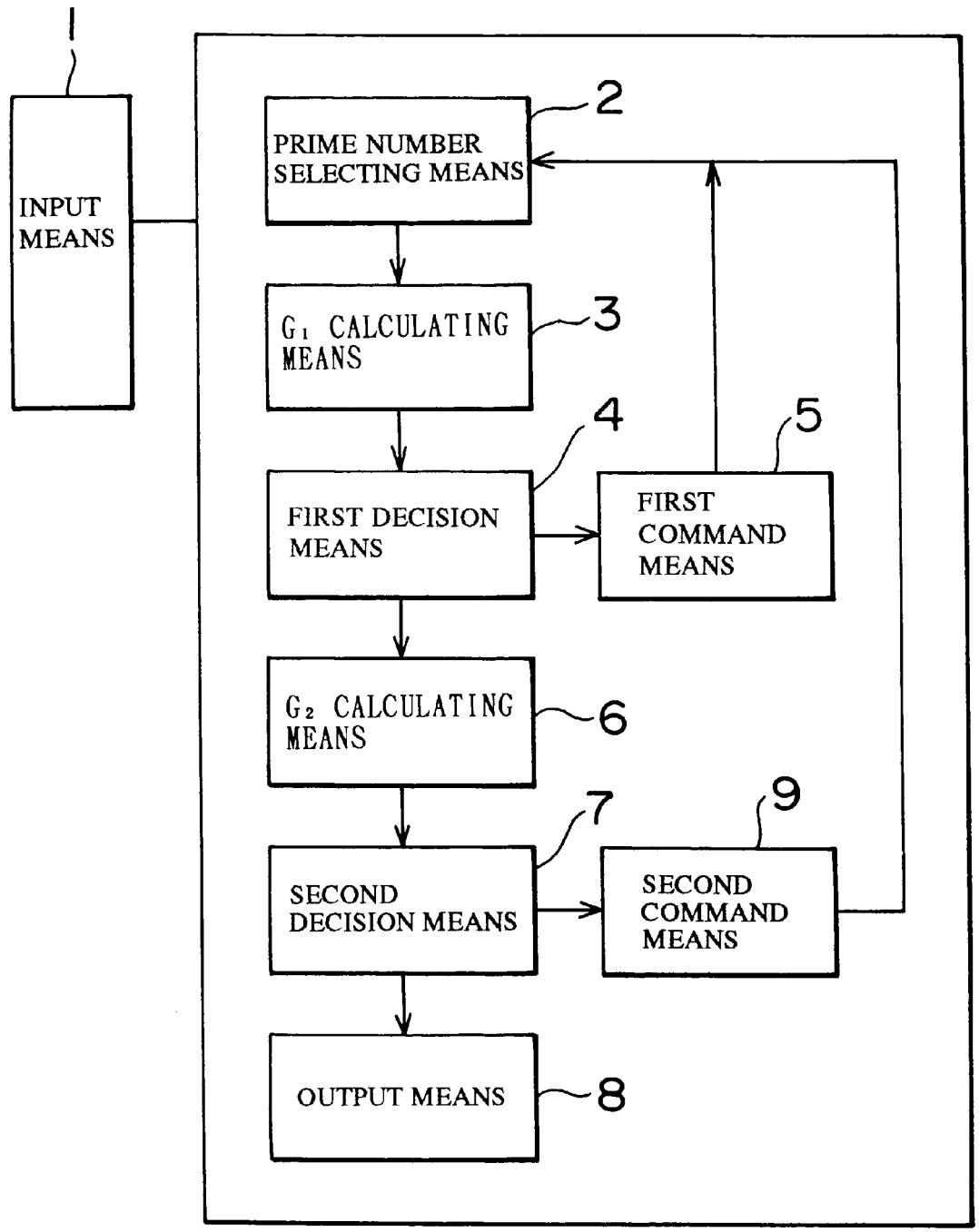
FIG. 5 is a block diagram for a processor in case where the representation of rational expression is impossible.

That is, the computer according to this embodiment has the following means as shown in FIG. 5:

(1) input means 1 for inputting a polynomial set F and term orders $O_1$ and $O_2$;

(2) prime number selecting means 2 for setting a prime number p which does not divide the coefficients of the head terms of all elements of F and is not used;

(3) $G_1$ calculating means 3 for calculating candidates (F, p, $O_1$) to obtain $G_1$;

(4) first decision means 4 for deciding whether $G_1$ is Gröbner basis of Id (F) or not;

(5) first command means 5 for commanding the prime number selecting means 2 to reset the prime number p when the first decision means 4 decide that $G_1$ is not the Gröbner basis;

(6) $G_2$ calculating means 6 for calculating candidates ($G_1$, p, $O_2$) to obtain $G_2$ when the first decision means 4 decides that the $G_1$ is the Gröbner basis, (7) second decision means 7 for deciding whether $G_2$ is a polynomial set or not;

(8) output means 8 for outputting $G_2$ as the Gröbner basis G of F with respect to $O_2$ when the second decision means 7 decides that $G_2$ is the polynomial set; and (9) second command means 9 for commanding to retry the calculation from the start when the second decision means 7 decide that $G_2$ is not the polynomial set.

It should be noted that the device used for the representation of rational expression may be also used for the above means (1) through (3).

Figure 6:
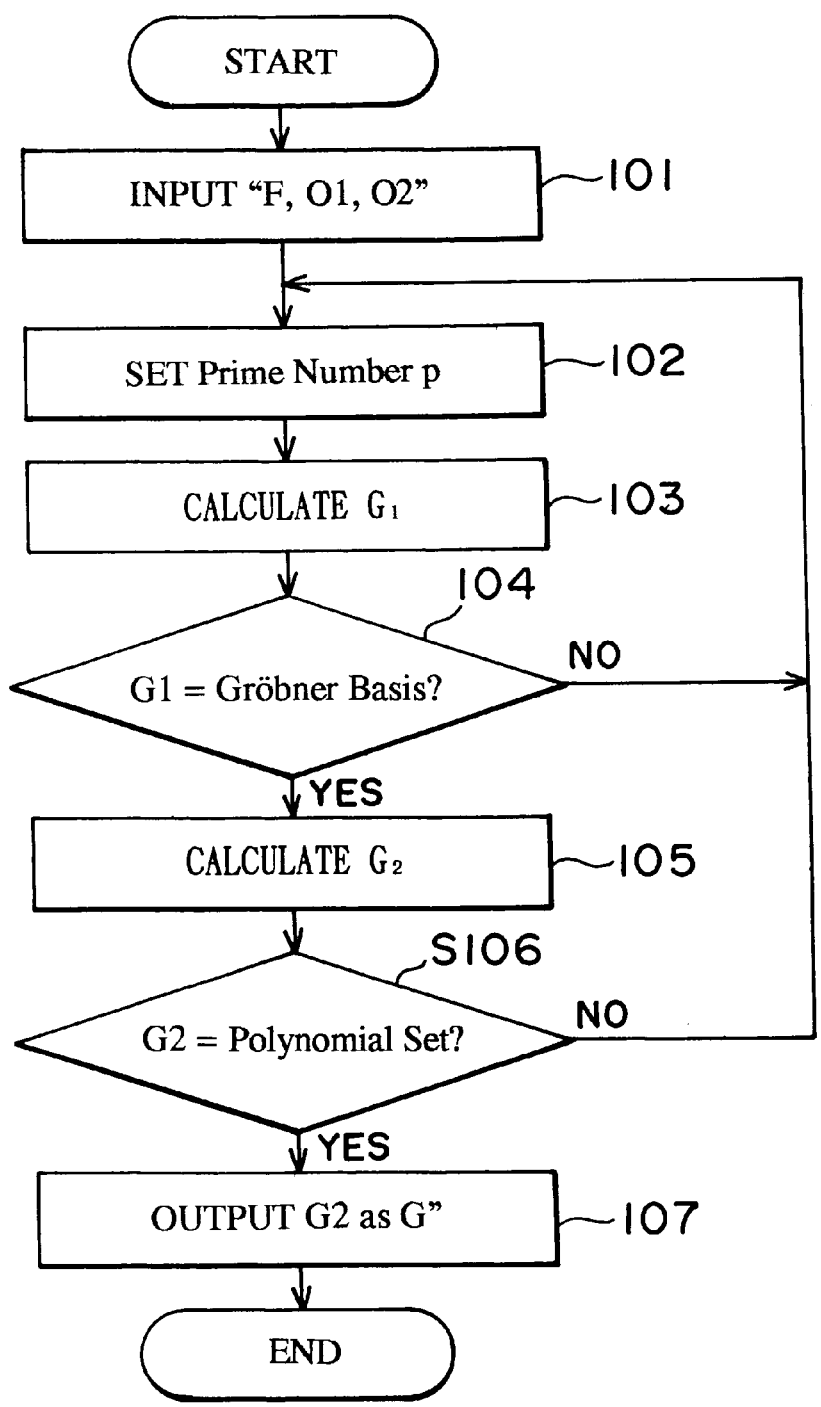
FIG. 6 is a flow chart showing the process in case where the representation of rational expression is impossible.

The generation of Gröbner basis according to the flow chart shown in FIG. 6 is executed by the aforementioned means.

First of all, a polynomial set F and term order $O_1$ and $O_2$ are inputted by the inputting means 1, for example, a key board (Step 101).

Then, a prime number p, which does not divide any coefficient of the head terms of all elements of F and is not used, is set by the prime number means 2 (Step 102). By referring to coefficients of the head terms of F according to a subroutine not shown, the prime number p can be automatically set.

Candidates (F, p, $O_1$) are calculated by the $G_1$ calculating means 3 to obtain the Gröbner basis $G_1$ of F with regard to $O_1$ (Step 103).

The first decision means 4 decides whether $G_1$ calculated by the $G_1$ calculating means 3 is Gröbner basis of Id (F) or not (Step 104). That is, the first decision means 4 decides whether the head term of g with regard to $O_1$ is divisible by p for each element g of $G_1$ or not and whether $\phi p$ (g) belongs to Id (F) or not. It is decided that $\phi p$ ($G_1$) is the Gröbner basis of $\phi p$ (F) with regard to $O_2$, when it is decided that the head term of g with regard to $O_1$ is divisible by p for each element g of $G_1$ and $\phi p$ (g) belongs to Id (F) ($\phi p$ means the operation of selecting a prime number p which is impossible to divide any head coefficient of all elements of $G_1$ and replacing the coefficient by the remainder regarding the prime number p.)

When the first decision means 4 decide that $G_1$ is not the Gröbner basis, the first command means 5 command the prime number selecting means 2 to reset the prime number p (Step 105).

When the first decision means 4 decides that the G, is the Gröbner basis, the $G_2$ calculating means 6 calculates candidates ($G_1$, p, $O_2$) to obtain $G_2$ (Step 106).

The second decision means 7 decide whether $G_2$ is a polynomial set or not (Step 107). That is, the second decision means 7 decide whether there is an integral coefficient polynomial $f_h$ belonging to Id (F) for each element h of $G'_2$ and the head term of $f_h$ with regard to $O_2$ is not divisible by p or not and whether the head terms of $f_h$ and h with regard to $O_2$ coincide with each other or not when $G'_2$ is the Gröbner basis of $\phi p$ (F) with regard to $O_2$. When it is decided that there is an integral coefficient polynomial $f_h$ belonging to Id (F) for each element h of $G'_2$ and the head term of $f_h$ with regard to $O_2$ is not divisible by p and that the head terms of $f_h$ and h with regard to $O_2$ coincide with each other when $G'_2$ is the Gröbner basis of $\phi p$ (F) with regard to $O_2$, the second decision means 7 decide that $G_2=\{f_h|h\ ((G)'_2)\}$ is Gröbner basis of F with regard to $O_2$.

When the second decision means 7 decide that $G_2$ is the polynomial set, the output means 8 outputs $G_2$ as the Gröbner basis G of F with respect to $O_2$ when the second decision means 7 decide that $G_2$ is the polynomial set.

When the second decision means 7 decide that $G_2$ is not the polynomial set, the second command means command to retry the calculation from the start.

According to the above process, the best Gröbner basis can be obtained even when the representation of rational expression is impossible, thereby optimizing the information processing.

<Applications of the Present Invention>

The present invention can be applied to such fields as follows.

Application 1: problems relating to the movement of a robot

Imagine, a state where one object (rigid body) 50 is supported by six arms 51 through 56 standing on a ground Gröbner which are variable in length as shown in FIGS. 7 and 8.

At this point, problems of calculating the position of the object based on the length of the arms and the positions of arms relative to the object and the ground are immediately converted to nonlinear simultaneous equations.

In the robot technology, huge studies have been conducted on the relation between the way of mounting the arms and the number of the possible positions. Such studies need to obtain values such as the number of "real solutions" of the given equation, which are not obtained by the conventional numerical methods. The method of the present invention is effective for such a case.

Application 2: condition (phase) analysis of magnetic substances

The description will be made as regard to $K_5$, $K_6$, and $K_7$ discussed above. Besides ferromagnetism and paramagnetism, there is Spin-glass as one of phases of magnetic substances. An integral equation is obtained by considering a Beth gridded random Ising model as one of models statistically working on the phase. A series of algebraic equations are obtained when finding non-continuous solutions at the absolute zero point of the integral equation. The series of algebraic equations are the non-linear simultaneous algebraic equation of variable n+1 described as kn.

The equation is solved for n=5, 6, 7, . . . with high precision by the present invention, thereby expecting a case where n becomes infinity and thus obtaining the solutions based on the expectation.

Other Applications:

Besides the above application, the inverse kinnematical calculation for finding the rotational angle of each Joint based on coordinates of the top of a normal articulated robot is well known in the robot technology. In Runge-Kutta method as one of effective methods for numerically solving differential equations, it is necessary to solve non-linear simultaneous algebraic equations for obtaining the best values of appeared parameters. The present invention is applicable to various information processing and controlling units requiring such calculation.

The present invention reduces the number of times required for calculating normal forms to calculate the minimum polynomial. Therefore, it can be decided in a short time whether the representation of rational expression is possible or not, whereby the linear equations are solved in such a time as corresponding the volume of the result. In addition, the molecules of the rational expressions can be obtained independently from each other and are solved in a parallel computer or in the distributed calculating environment, thereby making the calculating speed higher in the real time.

What is claimed is:

1. A method of controlling a robot including processing information wherein, in a model in which restrictions among parameters are given by simultaneous algebraic equations with integral coefficients when the simultaneous equations have only a finite number of solutions, zero points of a polynomial set F with integral coefficients, which represents the simultaneous equations and is described in a memory, are represented by rational expressions based on zero points of a one-variable polynomial so that the information is processed using the representation of rational expressions the method comprising:

1-1. choosing a term order $o_1$ for facilitating the calculation of the Gröbner basis, 1-2. calculating the Gröbner basis $G_1$ of F with regard to $o_1$, 1-3. calculating the minimum polynomial $f_1$ based on $G_1$, the minimum polynomial $f_1$, being a polynomial having the minimum degree of the variable $x_1$, 1-4. when it is decided that the degree of $f_1(x_1)$ is equal to the number of solutions given from $G_1$, 1-5. controlling a digital processor to find solutions represented by rational expressions $\{f_1(X_1)=0, X_2=f_2(X_1)/f'_1(X_1), \ldots, X_n=f_n(X_1)/f'_1(x_1)\}$,
wherein $f'_1(x_1)$ is differential of $f_1(x_1)$; and controlling the robot by using the solutions of the rational expressions.

2. A method as claimed in claim 1, wherein operations 1–3 comprising:

2-1. selecting a prime number p which does not divide any head coefficient of all elements of $(G_1)$ and assuming $\phi p$ as an operation of replacing the coefficient by the remainder regarding the prime number p;

2-2. obtaining the minimum polynomial $f_1(x_1)$ of $x_1$ obtained by $\phi p$ $(G_1)$, regarding p as the modulus;

2-3. obtaining a one-variable polynomial $f_1(x_1)$ in which the degree is equal to $f_1$ by replacing the coefficients of $f_1(x_1)$ by undetermined coefficients to calculate normal forms given by $G_1$ and eliminating the coefficients to solve linear equations with regard to the undetermined coefficients;

2-4. when the one-variable polynomial $f_1(x_1)$ is not obtained, repeating the steps 2-2 and 2-3 with replacing p to obtain the minimum polynomial of $x_1$.

3. A method as claimed in claim 1, wherein operations 1-5 comprising:

3-1. selecting a prime number p which does not divide any head coefficient of all elements of $(G_1)$ and assuming $\phi p$ as an operation of replacing the coefficient by the remainder regarding the prime number p;

3-2. calculating Gröbner basis $G_2$ with regard to the lexicographical order of $\phi p$ $(G_1)$;

3-3. obtaining a one-variable polynomial $f_1(x_1)$ by calculating normal forms given by G, of difference between $f'_1(x_1)$ $x_1$ and the normal form of $f'_1(x_1)$ $x_1$ given by $G_2$ in which the coefficients are replaced by undetermined coefficients in given by $G_1$ for every i (i=2, . . . , n) and eliminating the coefficients to solve linear equations with the undermined coefficients;

3-4. returning a rational expression: $\{f_1(x_1)=o, x_2=f_2(x_1)/f'_1(x_1), \ldots, x_n=f_n(x_1)/f'_1(x_1)\}$ as the solutions; and 3-5. repeating operations 3-2 through 3-4 re-selecting p selected in the step 3-1 when any one of the linear equations can not be solved.

4. A method as claimed in claim 3, wherein each fi is obtained on the processor at the same time.

5. A method as claimed in claim 1, wherein when, as a result of obtaining the minimum polynomial $f_1(x_1)$ in operations 1-3, the degree of $f_1(x_1)$ is not equal to the number of solutions given by $G_1$, the method further comprises:

5-1. selecting a prime number p which does not divide any head coefficient of all elements of $(G_1)$ and assuming $\phi p$ as an operation of replacing the coefficient by the remainder regarding the prime number p;

5-2. calculating Gröbner basis $G_2$ with regard to the term order o of $\phi p$ $(G_1)$;

5-3. finding an integral coefficient polynomial $f_h$ for each element h of $G_2$ of which the head coefficient is not divisible by p and the number of head terms coincide with the domain of h;

5-4. when the integral coefficient polynomials $f_h$ are found for all of the elements h of $G_2$, outputting the whole of $f_h$ as Gröbner basis of the integral polynomial set F with regard to the term order o; and 5-5. when any one of the integral coefficient polynomials $f_h$ is not found, re-selecting p selected in said step 5-1 and controlling the digital processor to repeat the steps 5-2 through 5-4 to generate the Gröbner basis.

6. A method as recited in claim 5, further comprising:

generating a Gröbner basis with regard to the term order o comprising:

preparing a plurality of medium-grade term orders relative to a term order o (assuming $o_1, o_2, \ldots, o_n$, =o) and executing the exchange of bases $o_1 \rightarrow o_2$, $o_2 \rightarrow o_3, \ldots, o_{n-1} \rightarrow o_n$ by the method as claimed in claim 5; and controlling the robot based upon the preparing.

7. A method as claimed in claim 6, wherein, in the step 5-3, $f_h$ is found in a candidate generating method by trace-lifting comprising:

7-1. calculating Grobner basis in the modulus p;

7-2. storing a history about members and terms in which the elimination was executed and pairs normalized to o, during normalizing $\phi(P)$ in this process;

7-3. calculating the Grobner basis on rational number based on the history of the foregoing paragraph, at this stage, not executing the normalization on the rational number in relation to the pairs normalized to o in the modulus p, but executing the normalization on the rational number based on the history in relation to pairs normalized to polynomial which is not o in the modulus p, 7-4. returning nil assuming that the method of selecting p is not appropriate, when the normalization on the rational number does not correspond to the normalization in the modulus p.

8. A method as claimed in claim 6, wherein, in operations 5-3, $f_h$ is found by replacing coefficients of elements of $G_2$ by undetermined coefficients to calculate normal forms given by $G_1$ and eliminating the coefficients to solve linear equations with regard to the undetermined coefficients.

9. A storage medium storing a program, said program controlling a computer to control a robot including processing information wherein, in a model in which restrictions among parameters are given by simultaneous algebraic equations with integral coefficients when the simultaneous equations have only a finite number of solutions, zero points of a polynomial set F with integral coefficients, which represents the simultaneous equations and is described in a memory, are represented by rational expressions based on zero points of a one-variable polynomial so that the information is processed using the representation of rational expressions the program controlling the computer to execute:

1-1. choosing a term order $o_1$ for facilitating the calculation of the Gröbner basis, 1-2. calculating the Gröbner basis $G_1$ of F with regard to $o_1$, 1-3. calculating the minimum polynomial $f_1$ based on $G_1$, the minimum polynomial $f_1$, being a polynomial having the minimum degree of the variable $x_1$ 1-4. when it is decided that the degree of $f_1(x_1)$ is equal to the number of solutions given from $G_1$, 1-5. controlling the computer to find solutions represented by rational expressions
$\{f_1(X_1)=o, X_2=f_2(X_1)/f'_1(X_1), \ldots, X_n=f_n(X_1)/f'_1(x_1)\}$, wherein $f'_1(x_1)$ is differential of $f_1(x_1)$; and controlling the robot by using the solutions of the rational expressions.

10. An apparatus controlling a robot and including a model in which restrictions among parameters are given by simultaneous algebraic equations with integral coefficients when the simultaneous equations have only a finite number of solutions, the apparatus represents zero points of a polynomial set F with integral coefficients, which represents the simultaneous equations and is described in a memory, by rational expressions based on zero points of a one-variable polynomial so that the apparatus processes information using the representation of rational expressions, wherein the apparatus comprises an information processor comprising:

term order choosing means for choosing an $O_1$ among terms for facilitating the calculation of the Gröbner basis;

Gröbner basis calculating means for calculating the Gröbner $G_1$ of F with regard to $O_1$;

minimum polynomial calculating means for calculating the minimum polynomial $f_1$ based on $G_1$, the minimum polynomial $f_1$ being a polynomial having the minimum degree of the variable $X_1$;

decision means for deciding whether the degree of $f_1(x_1)$ is equal to the number of solutions given from $G_1$ or not; and polynomial representing means for controlling the information processor to obtain solutions represented by rational expressions $\{f_1(x_1)=O, x_2=f_2(x_1)/f'_1(x_1), \ldots, x_n=f_n(x_1)/f'_1(x_1)\}$, wherein $f'_1(x_1)$ is a differential of $f_1(x_1)$, when the degree of $f_1(x_1)$ is equal to the number of the solutions given from $G_1$, wherein the apparatus determines a position of an object supported by the robot based upon the information processor.

11. A computer controlling a robot and comprising:

input means for inputting a polynomial set F and term order $O_1$ and $O_2$;

prime number selecting means for setting a prime number p which does not divide the coefficients of the head terms of all elements of F and is not used;

$G_1$ calculating means for calculating candidates (F, p, $O_1$) to obtain $G_1$;

first decision means for deciding whether $G_1$ is Gröbner basis of Id (F) or not;

first command means for commanding the prime number selecting means to reset the prime number p when the first decision means decide that $G_1$ is not the Gröbner basis;

$G_2$ calculating means for calculating candidates ($G_1$, p, $O_2$) to obtain $G_2$ when the first decision means decides that the $G_1$ is the Gröbner basis;

second decision means for deciding whether $G_2$ is a polynomial set or not;

output means for outputting $G_2$ as the Gröbner basis G or F with respect to $O_2$ when the second decision means decides that $G_2$ is the polynomial set; and second command means for commanding to retry the calculation from the start when the second decision means decides that $G_2$ is not the polynomial set, wherein the computer determines a position of an object supported by the robot.

12. A method of determining characteristics of mounting arms of a robot, comprising:

determining a model of the robot, said model including restrictions among parameters based upon simultaneous algebraic equations with integral coefficients;

representing all solutions to the simultaneous algebraic equations by rational expressions having zero points of a one-variable polynomial if the simultaneous algebraic equations have a finite number of solutions including zero points of a polynomial set with integral coefficients, wherein the one-variable polynomial is determined based upon a Gröbner basis and a degree of the one-variable polynomial is equal to a number of solutions of the Gröbner basis; and using the solutions to determine characteristics of the mounting arms.

13. An apparatus for controlling a robot including a model in which restrictions among parameters are given by simultaneous algebraic equation with integral coefficients when the simultaneous equations have only a finite number of solutions, the apparatus represents zero points of a polynomial set F with integral coefficients, which represents the simultaneous equations and is described in a memory, by rational expressions based on zero points of a one-variable polynomial so that the apparatus processes information using the representation of rational expressions, wherein the apparatus comprises an information processor comprising:

term order choosing means for choosing an $O_1$ among terms for facilitating calculation of Grobner basis;

Grobner basis calculating means for calculating Grobner $G_1$ of F with regard to $O_1$;

minimum polynomial calculating means for calculating the minimum polynomial $f_1$ based on $G_1$, the minimum polynomial $f_1$ being a polynomial having the minimum degree of variable $X_1$;

decision means for deciding whether a degree of $f_1(x)$ is equal to a number of solutions given from $G_1$ or not;

polynomial representing means for controlling the information processor to obtain solutions represented by rational expressions $\{f_1(x_1)=0, x_2=f_2(x_1)/f'_1(x_1), \ldots, x_n=f_n(x_1)/f'_1(x_1)\}$, wherein $f'_1(x_1)$ is a differential of $f_1(x_1)$, when the degree of $f_1(x_1)$ is equal to the number of the solutions given from $G_1$; and means for controlling the robot using the solutions of the rational expressions.

14. A computer used for computing characteristics of a robot comprising:

input means for inputting a polynomial set F and term order $O_1$ and $O_2$ representing characteristics of the robot;

prime number selecting means for setting a prime number p which does not divide the coefficients of the head terms of all elements of F and is not used;

$G_1$ calculating means for calculating candidates (F, p, $O_1$) to obtain $G_1$;

first decision means for deciding whether $G_1$ is Grobner basis of Id(F) or not;

first command means for commanding the prime number selecting means to reset the prime number p when the first decision means decides that $G_1$ is not the Grobner basis;

$G_2$ calculating means for calculating candidates ($G_1$, p, $O_2$) to obtain $G_2$ when the first decision means decides that the $G_1$ is the Grobner basis;

second decision means for deciding whether $G_2$ is a polynomial set or not;

output means for outputting $G_2$ as the Grobner basis G or F with respect to $O_2$ when the second decision means decides that $G_2$ is the polynomial set; and second command means for commanding to retry the calculation from the start when the second decision means decides that $G_2$ is not the polynomial set.

* * * * *